United States Patent [19]

Liu et al.

[11] Patent Number: 5,256,714
[45] Date of Patent: Oct. 26, 1993

[54] FLAME RETARDANT POLYESTER BLENDS

[75] Inventors: Ping Y. Liu, Naperville, Ill.; Nan-I Liu, Mt. Vernon, Ind.

[73] Assignee: General Electric Company, Pittsfield, Mass.

[21] Appl. No.: 759,126

[22] Filed: Sep. 10, 1991

Related U.S. Application Data

[63] Continuation-in-part of Ser. No. 574,377, Aug. 29, 1990, abandoned, which is a continuation of Ser. No. 138,861, Dec. 29, 1987, abandoned.

[51] Int. Cl.⁵ ............................................. C08K 5/533
[52] U.S. Cl. ........................................ 524/120; 524/123; 524/125; 524/164; 524/415; 524/416
[58] Field of Search ............... 524/415, 416, 123, 125, 524/120, 164

[56] References Cited

U.S. PATENT DOCUMENTS

| | | | |
|---|---|---|---|
| 3,928,283 | 12/1975 | Masai et al. | 524/125 |
| 3,931,099 | 1/1976 | King | 524/125 |
| 4,033,927 | 7/1977 | Borman | 524/125 |
| 4,117,042 | 9/1978 | Couchoud | 524/125 |
| 4,217,267 | 8/1980 | Hoffman et al. | 524/120 |
| 4,278,591 | 7/1981 | Granzow | 524/120 |
| 4,380,598 | 4/1983 | Robeson et al. | 524/164 |

OTHER PUBLICATIONS

Sharon Brauman et al–J. Fire Retardent Chemistry vol. 4 (May 1977) pp. 93-111.
Robert W. Stackman–Ind. Eng. Chem. Prod. Res. Dev. (1982) 21, 328-331.

*Primary Examiner*—Veronica P. Hoke

[57] ABSTRACT

Disclosed are flame retardant poly(butylene terephthalate) resins comprising:
(i) at least one polyester resin; and
(ii) a flame retardant effective amount of a mixture comprising (a) a polyphosphonate ester, (b) an ammonium polyphosphate, and (c) a halogenated benzosulfonate.

24 Claims, No Drawings

FLAME RETARDANT POLYESTER BLENDS

This is a continuation-in-part of copending application Ser. No. 07/574,377, filed on 29 Aug. 1990 now abandoned, which is a continuation of Ser. No. 138,861 filed 29 Dec. 1987 now abandoned.

BACKGROUND OF THE INVENTION

High molecular weight linear polyesters and copolyesters are well known and have enjoyed continued and increasing commercial success. These are especially useful resins because they provide compositions with excellent moldability, and molded articles therefrom having smooth and glossy surface appearance, high strength, stiffness, temperature resistance and other desirable properties.

Additionally, these resins may be modified to improve certain physical properties and further broaden their scope of application by incorporating therein various additives including fillers and reinforcing agents to enhance toughness and vary the stiffness of the material. Further, such resins and modified resins can be blended with other thermoplastic materials to enhance various physical properties and improve processability.

However, many polyester resins and resin blends suffer from and their applications are limited by their high flammability. In particular, where such resins are to be desired for many fields of use such as in home, construction, automobile and aircraft manufacturing, packaging, electrical equipment and the like, it is most desirable and often required that such materials be resistant to or have low flammability.

It is difficult to render polybutylene terephthalate resins (hereinafter referred to alternatively as "PBT" resins) flame retardant without sacrificing, to some degree, their inherent superior physical properties. Specifically, the use of conventional flame retardant additives, in conventional amounts, generally causes marked decreases in some of the advantageous physical properties of the PBT resins.

The U.S. Pat. No. 4,278,591 teaches that the combination of an ammonium polyphosphonate and a polyphosphonate ester is useful as a flame retardant in certain polymers. However, the cited patent teaches that such a combination has not been found useful as a flame retardant in the polybutylene terephthalate polymers apparently due to the higher processing temperatures used with these polymers causing decomposition of the ammonium polyphosphonate.

It has therefore been unexpectedly discovered that a mixture of a polyphosphonate ester, an ammonium phosphate and a halogenated benzo-sulfonate is an effective flame retardant for polyester resins, including polybutylene terephthalate resins.

SUMMARY OF THE INVENTION

The instant invention is directed to flame retardant polyester compositions. These compositions are comprised of at least one polyester resin and a flame retardant effective amount of a mixture of (a) a polyphosphonate ester, (b) an ammonium phosphate, and (c) a halogenated benzo sulfonate.

DETAILED DESCRIPTION OF THE INVENTION

In accordance with the instant invention there are provided flame retardant polyester resin compositions. These flame retardant compositions are comprised of:
(1) at least one polyester resin; and
(2) an effective flame retardant amount of a mixture of (a) a polyphosphonate ester, (b) an ammonium phosphate, and (c) a halogenated benzo sulfonate.

The polyester resins utilized in this invention include, in general, linear saturated condensation products of diols and dicarboxylic acids, or reactive derivatives thereof. Preferably, they will comprise condensation products of aromatic dicarboxylic acids and aliphatic diols. It is to be understood that it is also possible to use polyesters such as poly(1,4-dimethylol cyclohexane dicarboxylates, e.g., terephthalates). In addition to phthalates, small amounts of other aromatic dicarboxylic acids, such as naphthalene dicarboxylic acid, or aliphatic dicarboxylic acids, such as adipic acid, can also be present in preferred compositions. The diol constituent can likewise be varied, in the preferred embodiments, by adding small amounts of cycloaliphatic diols. In any event, the preferred polyesters are well known as film and fiber formers, and they are provided by methods outlined in Whinfield, U.S. Pat. No. 2,465,319 and Pengilly, U.S. Pat. No. 3,047,539 and elsewhere. The preferred polyesters will comprise a poly(alkylene terephthalate, isophthalate or mixed isophthalate-terephthalate, e.g., up to 30 mole percent isophthalate), said alkylene groups containing from 2 to 10 carbon atoms, e.g., poly(ethylene terephthalate) or poly(1,4-butylene terephthalate). Because of its rapid crystallization from the melt, it is preferred to use poly(1,4-butylene terephthalate) as the normally flammable polyester resin component of the present compositions.

While poly(1,4-butylene terephthalate)homopolyester is the preferred poly(butylene terephthalate) polymer, copolyesters thereof are also suitable. Such copolyesters generally comprise at least about 70 mole percent, and preferably at least 80 mole percent, based on total monomer content, of butylene and terephthalate units. The comonomer may be either a dicarboxylic acid or diol or a combination of the two. Suitable dicarboxylic acid comonomers include the $C_8$ to $C_{16}$ aromatic dicarboxylic acids, especially the benzene dicarboxylic acids, i.e. phthalic and isophthalic acids and their alkyl, e.g. methyl, derivatives and $C_4$ to $C_{16}$ aliphatic and cycloaliphatic dicarboxylic acids including, for example, sebacic acid; glutaric acid; azelaeic acid; tetramethyl succinic acid; 1,2-, 1,3- and 1,4-cyclohexane dicarboxylic acids and the like, as mentioned above. Suitable diol comonomers include but are not limited to $C_2$ to $C_8$ aliphatic and cycloaliphatic diols, e.g. ethylene glycol, hexanediol, butanediol and 1,2-, 1,3- and 1,4-cyclohexanedimethanol. Other suitable diols are well known to those skilled in the art.

The foregoing polyester resins and resin compositions may be rendered flame retardant or less flammable by the addition of a flame retardant effective amount of a mixture of (a) a polyphosphonate ester, (b) an ammonium phosphate, and (c) a halogenated benzo-sulfonate.

The polyphosphonate esters utilized in the present invention include polymeric pentaerythrityl phosphonates as are disclosed in U.S. Pat. No. 4,217,267, which is incorporated herein by reference. The preferred polyphosphonate ester utilized is of the formula

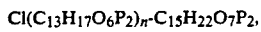

where n is at least 2, and is the reaction product of aα,ω'-dichloro-p-xylene and a diethyl pentaerythritol diphosphite, and is manufactured by American Cyanamid Company under the tradename Cyagard RF-1041.

The ammonium phosphates which are utilized in the present invention are known and may be prepared as exemplified in U.S. Pat. Nos. 3,423,343 and 3,513,114. They preferably have the general formula $(NH_4)_nH_2P_nO_{3n+1}$, wherein n is 1 or more or $(NH_4PO_3)_n$ wherein n represents an integer equal to or greater than 2. The molecular weight of the polyphosphates should preferably be sufficiently high so as to ensure a low solubility in water.

An example of such polyphosphates is the one marketed under the trademark "Exolit 263" (produced and sold by American Hoechst Corporation which has the composition $(NH_4PO_3)_n$ in which n is greater than 50. Still another example is the product marketed under the trademark "Phos-Check P/30" (by Monsanto Chemical Co.) and Exolit 422 by American Hoechst Corporation which both have an analogous composition to Exolit 263.

The halogenated benzosulfonate compound of the present invention is of the formula

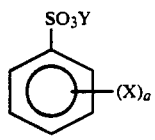

wherein X represents halogen, and preferably Br or Cl, Y represents Na or K and a is an integer from 1 to 5, and derivatives thereof.

The preferred halogenated benzosulfonate is Na-2,4,5-trichloro benzosulfonate.

Optionally, to further improve the flame retardant compositions of the present invention, various oxides and/or carbonates may be added. Generally they are added to the polymer in amounts ranging from about 0.25 percent to 6 percent by weight, based on the weight of the polymer. Useful compounds include alkali metal carbonates, such as sodium carbonate, potassium carbonate, etc.; alkaline earth metal oxides such as barium oxide, magnesium oxide, etc.; alkaline earth metal carbonates, such as magnesium carbonate, calcium carbonate, etc.; Group IV-A metal oxides, such as silicon dioxide, stannic oxide, etc.; titanium dioxide, zinc oxide, aluminum oxide, antimony oxide, and the like. If oxides are used, they are preferably deployed in a carrier to facilitate handling. The carrier used will be chosen based on its compatability with the resin and the oxide. For example, when polybutylene terephthalate is the resin and the oxide is antimony oxide, ethylene vinyl acetate is a suitable carrier.

The flame retardant mixture may also contain an effective amount of a non-dripping agent. This amount will generally be from about 0.01 to about 5 parts by weight, preferably from about 0.05 to about 2.0 parts by weight, based on 100 parts by weight of the total composition. Suitable non-dripping agents are well-known and widely available. They include the fumed and colloidal silicas and polytetrafluoroethylene resins. Especially preferred are the polytetrefluoroethylene resins, most preferably TEFLON® 30 from E.I. DuPont. This non-dripping agent can be utilized by itself or in the form of a concentrate, using a suitable polymeric carrier which is well-known to those skilled in the art.

The amount of the flame retardant mixture which is present in the instant composition is an effective flame retardant amount. By effective flame retardant amount is meant an amount of the mixture which is effective to flame retard the polyester resin. Generally, this amount is at least about 10 weight percent, based on the total amounts of the flame retardant resin and the resin(s) present in the composition, preferably at least about 15 weight percent, and more preferably at least about 20 weight percent. Generally, an amount of about 60 weight percent of flame retardant mixture should not be exceeded, preferably an amount of about 55 weight percent of the mixture should not be exceeded, and more preferably an amount of about 50 weight percent of the mixture should not be exceeded. Generally, if the compositions contain less than about 10 weight percent of the mixture there is no significant improvement in the flame retardancy of the polyester resin. Amounts of the mixture in excess of about 60 weight percent do not generally appreciably increase or improve the flame retardancy of the instant compositions.

Furthermore, the amount of the mixture used is generally dependent upon the particular compounds used in the mixture and upon the particular polyester resin(s) present.

For every 100 parts by weight of flame retardant mixture utilized in the invention, the amount of polyphosphonate ester will range from about 30 parts by weight to about 75 parts by weight, the amount of ammonium polyphosphate will range from about 25 parts by weight to about 70 parts by weight and the amount of halogenated benzo sulfonate will range from about 0.5 parts by weight to about 10 parts by weight.

The flame retardant mixture can contain more than one type of ammonium polyphosphate and/or more than one type of polyphosphonate ester and/or halogenated benzo sulfonate, depending upon the needs of the individual practitioner of the invention.

While the compositions of this invention possess many desirable properties, it is sometimes advisable and preferred to further stabilize certain of the compositions against thermal or oxidative degradation as well as degradation due to ultraviolet light. This can be done by incorporating stabilizers into the blend compositions. Satisfactory stabilizers comprise phenols and their derivatives, amines and their derivatives, compounds containing both hydroxyl and amine groups, hydroxyazines, oximes, polymeric phenolic esters and salts of multivalent metals in which the metal is in its lower state.

Representative phenol derivatives useful as stabilizers include 3,5-di-tert-butyl-4-hydroxy hydrocinnamic triester with 1,3,5-tris-(2-hydroxyethyl-s-triazine-2,4,6-(1H, 3H, 5H) trione; 4,4'-bis(2,6-ditertiary-butylphenyl); 1,3,5-trimethyl-2,4,6-tris-(3,5-ditertiary-butyl-4-hydroxylbenzyl)benzene and 4,4'-butylidene-bis(6-tertiarybutyl-m-cresol). Various inorganic metal salts or hydroxides can be used as well as organic complexes such as nickel dibutyl dithiocarbamate, manganous salicylate and copper 3-phenyl-salicylate. Typically amine stabilizers include N,N'-bis(beta-naphthyl)-p-phenylenediamine; N,N'-bis(1-methylheptyl)-p-phenylenediamine and either phenyl-beta-naphthyl amine or its reaction products with aldehydes. Mixtures of hindered phenols with esters or thiodipropionic, mercaptides and phosphite esters are particularly useful. Additional stabilization to ultraviolet light can be obtained by compounding with various UV absorbers such as substituted benzophenones and/or benzotriazoles.

It is also within the scope of the invention to incorporate such ingredients as plasticizers, dyes, pigments, various other heat and light stabilizers, antioxidants, antistatic agents, photochromic materials and the like, into the polyester composition.

The following examples are presented to more fully and clearly illustrate the present invention. They are presented as illustrative of the invention and are not to be construed as limiting the invention thereto. In the examples all parts and percentages are on a weight basis unless otherwise indicated.

Unless otherwise stated, all compositions were prepared by dry blending the ingredients followed by extrusion through a single screw extruder at 460° F. Test specimens were prepared by injection molding in accordance with proper specifications for UL determinations.

The following ASTM methods were used in determining the physical characteristics of the compositions:

| | |
|---|---|
| Flexural Modulus | ASTM D790 |
| Notched Izod | ASTM D256 |
| Tensile Strength | ASTM D638 |
| Flexural Strength | ASTM D790 |

Flammability tests were performed in following with the procedure of Underwriter's Laboratory Bulletin 94 entitled "Tests for Flammability of Plastic Materials, UL94". According to this procedure, the materials were classified as either UL94 HB, UL94 V-O, UL94 V-I or UL94 V-II on the basis of the test results obtained for five samples. The criteria for each of these flammability classifications according to UL94, are, briefly, as follows:

HB: In a 5 inch sample, the rate of burn of the sample is less than 3 inches per minute and the flames should be extinguished before 4 inches of the sample are burned.

V-O: the average period of flaming and/or smoldering after removing the igniting flame should not exceed five seconds and none of the samples should produce drips of particles which ignite absorbent cotton.

V-I: the average period of flaming and/or smoldering after removing the igniting flame should not exceed twenty-five seconds and none of the samples should produce drips of particles which ignite absorbent cotton.

V-II: the average period of flaming and/or smoldering after removing the igniting flame should not exceed twenty-five seconds and the samples produce drips of burning particles which ignite burning cotton.

Examples 1 and 2 illustrate a composition falling outside the scope of the instant invention and is presented for comparative purposes only.

EXAMPLE 1

A composition consisting essentially of 99.85 parts by weight of a poly(1,4-butylene terephthalate)resin and 0.15 weight parts of a hindered phenol antioxidant (Irganox 1076, manufactured by Ciba-Geigy) is molded into test bars measuring 5"×½×1/16". These test bars are subject to the test procedure set forth in Underwriters Laboratories UL94 Bulletin, and the results are set forth in Table II below.

EXAMPLE 2

Example 2 also illustrates a composition that is outside the scope of the present invention. The formulation of the composition of Example 2 is set forth in Table I below. The composition of Example 2 is also formulated into test bars and tested as per the procedure utilized for Example 1. The results of the physical testing are set forth in Table II below.

EXAMPLES 3-4

Examples 3-4 utilize the polyester of Example 1 and are exemplary of the present invention. These Examples, which are formulated as per Table I, were molded into test bars of the same dimensions as in Example 1. These test bars were subjected to the UL-94 test and the results are set forth in Table II. The compositions were also subjected to tests for physical properties, with sample dimensions as provided for in the respective ASTM method, the results of which are set forth in Table II.

In Table I, all parts are listed in terms of percent by weight.

TABLE I

| Example | 1 | 2 | 3 | 4 |
|---|---|---|---|---|
| PBT | 99.85 | 94.25 | 63.75 | 63.75 |
| STB | — | — | 0.5 | 0.5 |
| PPE | — | — | 20 | 15 |
| TEFLON Conc. | — | .6 | 0.6 | 0.6 |
| STAB | 0.15 | .15 | 0.15 | 0.15 |
| APP | — | — | 10 | 15 |
| AOC | — | 5 | 5 | 5 |

TABLE II

| | (UL94 Rating) |
|---|---|
| Example | |
| 1 | burns |
| 2 | V-II |
| 3 | V-O |
| 4 | V-O |

NOTE:
PBT is poly(1,4-butylene terephthalate)resin.
STB is Na-2,4,5-trichlorobenzo sulfonate.
PPE is polyphosphonate ester, Cyagard RF-1041, from American Cyanamid.
STAB is Irganox 1076.
APP is ammonium polyphosphate.
AOC is an antimony oxide in an ethylene vinyl acetate carrier.

TABLE III

| Example | 1 | 2 | 3 | 4 |
|---|---|---|---|---|
| Notched Izod Impact, Ft. Lbs/In. | 1.0 | 1.0 | .96 | .92 |
| Tensile Strength, psi | 7,500 | 8,850 | 6,340 | 6,420 |
| Flexural Strength, psi | 12,000 | 14,420 | 13,770 | 12,730 |
| Flexural Modulus, psi | 340,000 | 413,000 | 654,000 | 597,000 |

In comparative tests set forth below as Examples 5 and 6, which illustrate compositions which fall outside the present invention, the same poly(1,4-butylene terephthalate) resin utilized in Examples 1-4 was compounded with various components using the same method of preparation as was used for Examples 1-4. The stabilizer, AOC, Telfon Conc., and APP used in Examples 5 and 6 were the same as used in some or all of Examples 1-4. The various formulations for Examples 5 and 6 are set forth in Table IV below:

TABLE IV

| | EXAMPLES | |
|---|---|---|
| | 6 | 7 |
| PBT | 84.25 | 80.35 |
| AOC | 5 | 4 |
| TEFLON CONC | 0.6 | 0.5 |
| STAB (phr) | 0.15 | 0.15 |
| APP | 10 | 15 |

TABLE V sets for the results the physical testing of the compositions of Examples 5 and 6:

TABLE V

| | EXAMPLES | |
|---|---|---|
| PROPERTY | 5 | 6 |
| N.I. | 0.38 | 0.44 |
| T.S. | 7,525 | 6,846 |
| F.S. | 9,829 | 13,180 |
| F.M. | 492,000 | 500,000 |
| Fb | V-II | V-II |

N.I. = Notched Izod Impact, Ft. Lbs/In.
T.S. = Tensile Strength, psi.
F.S. = Flexural Strength, psi
F.M. = Flexural Modulus, psi
Fb = Flammability Examples 5 and 6 indicate that APP, by itself, is ineffective in flame retarding PBT compositions. In addition, compositions modified with APP showed a significant decrease in their Notched Izod values over unmodified PBT or PBT as modified pursuant to Examples 2-4.

From the above data, it is apparent that the flame retardant mixture of the present invention serves to adequately render the polyester materials of the present invention flame resistant without sacrificing the materials' desirable physical properties.

What is claimed is:

1. A flame retardant thermoplastic composition comprising:
   (A) a poly(butane terephthalate) resin; and
   (B) a flame retardant effective amount of a mixture comprising (i) a polyphosphonate ester, (ii) an ammonium polyphosphate (iii) a halogenated benzosulfonate; wherein said halogenated benzosulfonate component ranges from about 0.5 to about 10 weight parts said polyphosphonate ester component ranges from about 30 to about 75 weight parts, and said ammonium polyphosphate component ranges from about 25 to about 70 weight parts, for every 100 weight parts of the mixture.

2. The composition of claim 1 which contains at least about 10 weight percent of said mixture, based on the total amount of said mixture and said resin.

3. The composition of claim 2 which contains at least about 15 weight percent of said mixture.

4. The composition of claim 3 which contains at least 20 weight percent of said mixture.

5. The composition of claim 1 wherein the ammonium polyphosphate has the composition (NH$_4$PO$_3$)$_n$ wherein n is an integer greater than 50.

6. The composition of claim 1 wherein the poly(butylene terephthalate) is poly(1,4-butylene terephthalate).

7. The composition of claim 1 wherein the halogenated benzosulfonate is of the formula

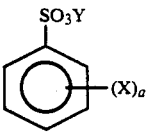

wherein X represents halogen, K represents Na or K and a is an integer from 1 to 5, and derivatives thereof.

8. The composition of claim 7 wherein X is Cl or Br.

9. The composition of claim 8 wherein X is Cl.

10. The composition of claim 7 wherein y is Na.

11. A flame retardant thermoplastic composition comprising:
   (A) at least one polyester resin; and
   (B) a flame retardant effective amount of a mixture comprising (i) a polyphosphonate ester, (ii) and ammonium polyphosphate, and (iii) a halogenated benzosulfonate, wherein said at least one polyester resin comprises the predominant component by weight of the thermoplastic composition, and wherein said halogenated benzosulfonate component ranges from about 0.5 to about 10 weight parts, said polyphosphonate ester component ranges from about 30 to about 75 weight parts, and said ammonium polyphosphate component ranges from 25 to about 70 weight parts, for every 100 weight parts of the mixture.

12. The flame retardant thermoplastic composition according to claim 11, wherein said at least one polyester resin comprises primarily poly(butylene terephthalate).

13. The flame retardant thermoplastic composition according to claim 11, wherein said at least one polyester resin consists essentially of poly(butylene terephthalate).

14. A flame retardant thermoplastic composition comprising:
   (A) at least one polyester resin; and
   (B) a flame retardant effective amount of a mixture comprising (i) a polyphosphonate ester, (ii) an ammonium polyphosphate, and (iii) a halogenated benzosulfonate, wherein said at least 1 polyester resin comprises the predominate component by weight of the thermoplastic composition; and wherein the amount of said flame retardant mixture comprises at least about 10 weight percent of the flame retardant thermoplastic composition.

15. The flame retardant thermoplastic composition according to claim 14, wherein the amount of said flame retardant mixture comprises at least about 15 weight percent of the flame retardant thermoplastic composition.

16. The flame retardant thermoplastic composition according to claim 15, wherein the amount of said flame retardant mixture comprises at least about 20 weight percent of the flame retardant thermoplastic composition.

17. The composition of claim 14, wherein, in the mixture, the halogenated benzosulfonate component ranges from about 0.5 to about 10 weight parts, the polyphosphonate ester component ranges from about 30 to about 75 weight parts, and the ammonium polyphosphate component ranges from about 25 to about 70 weight parts, for every 100 weight parts of the mixture.

18. The flame retardant thermoplastic composition according to claim 14, wherein said at least one polyester resin comprises a poly(alkylene terephthalate) resin.

19. A flame retardant thermoplastic composition comprising:
(A) at least one polyester resin; and
(B) a flame retardant effective amount of a mixture comprising (i) a polyphosphonate ester, (ii) an ammonium polyphosphate, and (iii) a halogenated benzosulfonate, wherein said at least polyester resin comprises the predominate component by weight of the thermoplastic composition; and wherein the amount of said flame retardant mixture comprises at least about 10 weight percent and not more than about 60 weight percent of the flame retardant thermoplastic composition.

20. The flame retardant thermoplastic composition according to claim 19, wherein the amount of said flame retardant mixture comprises at least about 15 weight percent and not more than about 55 weight percent of the flame retardant thermoplastic composition.

21. The flame retardant thermoplastic composition according to claim 20, wherein the amount of said flame retardant mixture comprises at least about 20 weight percent and not more than about 50 weight percent of the flame retardant thermoplastic composition.

22. The flame retardant thermoplastic composition according to claim 19, wherein said at least one polyester resin comprises a poly(alkylene terephthalate) resin.

23. The flame retardant thermoplastic composition according to claim 22, wherein said poly(alkylene terephthalate) resin comprises poly(butylene terephthate).

24. The composition of claim 19, wherein, in the mixture, the halogenated benzosulfonate component ranges from about 0.5 to about 10 weight parts, the polyphosphonate ester component ranges from about 30 to about 75 weight parts, and the ammonium polyphosphate component ranges from about 25 to 70 weight parts, for every 100 weight parts of the mixture.

* * * * *